United States Patent [19]

Ahrweiler et al.

[11] Patent Number: 4,995,147
[45] Date of Patent: Feb. 26, 1991

[54] ROLL HAVING IMPROVED TRANSVERSE END SEALS

[75] Inventors: Karl-Heinz Ahrweiler, Willich; Bernhard Funger, Krefeld, both of Fed. Rep. of Germany

[73] Assignee: Eduard Küsters Maschinenfabrik GmbH & Co. KG, Krefeld, Fed. Rep. of Germany

[21] Appl. No.: 451,210

[22] Filed: Dec. 15, 1989

[30] Foreign Application Priority Data

Dec. 23, 1988 [DE] Fed. Rep. of Germany ....... 3843434

[51] Int. Cl.$^5$ .............................................. B21B 13/02
[52] U.S. Cl. ..................................... 29/116.1; 29/123; 29/129.5
[58] Field of Search ..................... 29/116.1, 116.2, 123, 29/124, 125, 129.5, 130; 26/78, 80, 97, 99; 100/155 R, 168, 169

[56] References Cited

U.S. PATENT DOCUMENTS 3,885,283  5/1975  Biondetti ........................ 29/116
4,447,940  5/1984  Appenzeller ..................... 29/116

Primary Examiner—P. W. Echols
Assistant Examiner—David P. Bryant
Attorney, Agent, or Firm—Kenyon & Kenyon

[57] ABSTRACT

In a hydraulically supported roll including a rotatable hollow cylinder and a stationary crosshead, transverse end seals are provided to seal a longitudinal chamber formed in the clearance space between the crosshead and the hollow cylinder. Each transverse end seal includes a roller bearing having a first bearing ring rotatable with the hollow cylinder and a second bearing ring mounted on the crosshead. The first bearing ring includes a first surface, which along with a second surface formed on a ring secured to the crosshead, defines a clearance gap. The gap has a width of less than 0.1 mm. The first bearing ring seals the longitudinal chamber at the inner circumference of the hollow cylinder and the first and second gap defining surfaces are located on parts that are axially restrained with respect to the crosshead.

19 Claims, 1 Drawing Sheet

ROLL HAVING IMPROVED TRANSVERSE END SEALS

BACKGROUND OF THE INVENTION

The invention relates generally to rolls for treating webs of material and, more particularly, to an improved sealing arrangement for a hydraulically supported roll.

A hydraulically supported roll having a rotatable hollow cylinder forming the working roll circumference and a stationary crosshead extending lengthwise through the hollow cylinder to form a surrounding clearance space with the inner circumference of the hollow cylinder is disclosed in DE-PS No. 31 28 140. External forces for supporting the roll are applied to the ends of the crosshead that project from the hollow cylinder, which is supported on the crosshead by hydraulic fluid in the clearance space. Transverse end seals, designed as clearance seals, are provided between the hollow cylinder and the crosshead to seal the ends of the clearance space. The transverse end seals have radially extending, flat surfaces that are maintained at a spacing from each other, independent of relative displacement between the crosshead and the hollow cylinder, by a roller bearing having a bearing ring that forms one of the flat surfaces.

The hollow cylinder disclosed in the above-mentioned document is supported for rotation relative to the crosshead by bearings mounted on the ends of the crosshead. At each of these ends, a ring is fixedly attached to the hollow cylinder at the inner side of the bearing for rotation with the hollow cylinder. This ring simultaneously forms one of the flat surfaces of the clearance seal and one of the bearing rings of the roller bearing. The other bearing ring of the roller bearing carries the other flat surface, which is parallel to the first flat surface and is spaced opposite it at a small clearance of less than 0.1 mm, generally in the range of 0.02 mm. The other bearing ring does not rotate, but rather is fixed with the crosshead; however, this ring is axially displaceable to the small degree required. The compression in axial direction is effected by circumferentially distributed compression springs that are supported on an extension of the crosshead.

Rolls of the type discussed above are generally designed as hydraulically supported, so-called "swimming rolls". In these rolls, longitudinal seals extend at diametrically opposite sides of the crosshead between the transverse end seals, and together with the transverse end seals, define a somewhat semi-cylindrically-shaped longitudinal chamber, which is pressurizable with hydraulic fluid. When pressurized, the fluid in the longitudinal chamber supports the hollow cylinder. In addition, other types of hydraulic devices for supporting the hollow cylinder, such as those in which the transfer of forces from the crosshead to the inner circumference of the hollow cylinder is effectuated by separate hydrostatic supporting elements distributed along the length of the hollow cylinder, are contemplated with the present invention. In these types of rolls, the clearance space remaining between the crosshead and the inner circumference of the hollow cylinder may be filled with hydraulic fluid. To prevent discharge of this fluid, a seal must be provided. Further, although the invention is applicable primarily to rolls having hollow cylinders fixedly supported by bearings, the invention also is applicable to those rolls in which the hollow cylinder can execute what is known as "inner lift", as is disclosed in DE-AS No. 22 54 392.

The present invention arose in connection with the problems that occurred when especially high line pressures had to be transmitted, at high hydraulic fluid temperatures, by the longitudinal chamber of supported swimming rolls of the type discussed above. Under these conditions, pronounced deflections of the crosshead and, thus, pronounced changes in the angle of the crosshead relative to the inner circumference of the hollow cylinder occurred in the area of the transverse end seals, in addition to especially pronounced axial displacements of the hollow cylinder relative to the crosshead, because of the difference in the coefficients of thermal expansion of the hollow cylinder and the crosshead. Because the first gap defining surface of the transverse end seal of the type disclosed in DE-PS 31 28 140 is mounted on the hollow cylinder, the transverse end seal also undergoes both the considerable axial displacements and the pronounced angular changes of the hollow cylinder. This causes problems such as one-sided loading of the rolling elements of the roller bearings, which maintain the spacing between the first and second surfaces, and wear and tear of the seal located between the first bearing ring of the roller bearing and the crosshead.

SUMMARY OF THE INVENTION

The invention is directed to providing a transverse end seal of the general type discussed above that avoids the above-mentioned problems and disadvantages and is less affected by pronounced displacements in the vicinity of the transverse end seals.

The invention solves these problems and avoids these disadvantages by providing a roll formed by a rotatable hollow cylinder, having an inner circumference and an outer working circumference, and a stationary crosshead extending lengthwise through the hollow cylinder to form a surrounding clearance space with the inner circumference of the hollow cylinder. The crosshead has ends protruding from the hollow cylinder upon which external forces for supporting the roll can be applied. A hydraulic device is provided in the clearance space for supporting the hollow cylinder. Transverse end seals are mounted near the ends of the crosshead and extend between the crosshead and the inner circumference of the hollow cylinder to seal the clearance space. Each transverse end seal includes first and second flat, radially extending, surfaces spaced from each other to define a clearance gap therebetween. A first bearing ring mounted for rotation with the hollow cylinder has an outer portion, slightly displaceable relative to the remaining portion of the first bearing ring, sealing the clearance space at the inner circumference of the hollow roll. The first surface is formed on the first bearing ring. A second bearing ring is mounted on the crosshead and a roller bearing is disposed between the first and second bearing rings. The roller bearing maintains the spacing between the first and second surfaces independent of relative displacement between the hollow cylinder and the crosshead whereby the first and second surfaces are axially fixed with respect to the crosshead.

One of the fundamental advantages of the invention over the prior art is that both surfaces that define the clearance gap now are supported by the crosshead and, thus, the roller bearing is no longer affected by relative displacement of the axes of the hollow cylinder and the crosshead, i.e., by the misalignment of these two parts.

Both gap defining surfaces are carried by the crosshead in the area corresponding to the length of the transverse end seal and, accordingly, hardly experience any changes in their relative angular position that would be transmitted to the roller bearing.

An additional advantage of the invention is that the gap width can be adjusted easily when both gap surfaces are axially fixed with respect to the crosshead. This adjustment can be accomplished, for example, by forming the second bearing ring as a nut threaded on the crosshead whereby rotation of the nut adjusts the width of the clearance gap.

Another important advantage is obtained by arranging the first surface of the clearance gap to face the interior of the hollow roll and mounting the roller bearing axially outside the gap. As a result of this configuration, fluid pressure is exerted axially outwardly on the first surface, which is formed on the first bearing ring. This pressure axially compresses the roller bearing and eliminates the need for springs to achieve the requisite mutual contact in the bearing.

The first bearing ring may be formed from a thrust ring and the inner race of the roller bearing, while the second bearing ring may be formed from a nut mounted on the crosshead and the outer race of the roller bearing. Such a construction in which the bearing rings are manufactured in two parts is recommended to optimize functional efficiency. In this manner, the specially hardened races, as well as the thrust ring and nut, may be manufactured separately. When the bearing rings are constructed in two parts, the outer race of the roller bearing abuts the nut and the inner race abuts the thrust ring.

In the seal arrangement disclosed in DE-PS No. 31 28 140, each bearing ring included one of the surfaces forming the clearance gap. In the present invention, one of the gap surfaces is not formed on the bearing rings, but rather is part of the crosshead. For ease of manufacture, this gap surface may be formed on another ring, which is secured to the crosshead.

In order to seal the inner circumference of the hollow cylinder, a sealing ring having limited mobility is mounted, with play, in a groove of the rotatable bearing ring. The sealing ring can move within the groove, but its external circumference, which abuts the inner circumference of the hollow cylinder, remains stationary or undergoes only small displacements relative to the hollow cylinder. This is important to minimize wear and tear on the hollow cylinder in the vicinity of the sealing ring. If the sealing ring were to operate when the hollow cylinder was deflected a large amount and the seal could be displaced only in a direction perpendicular to the longitudinal axis, such a displacement would have to occur with every revolution of the hollow cylinder, thereby leading to a large amount of frictional strain even when the relative displacement was small.

Further features, advantages and embodiments of the invention are apparent from consideration of the following detailed description, drawings and appended claims.

DETAILED DESCRIPTION

Figure 1:
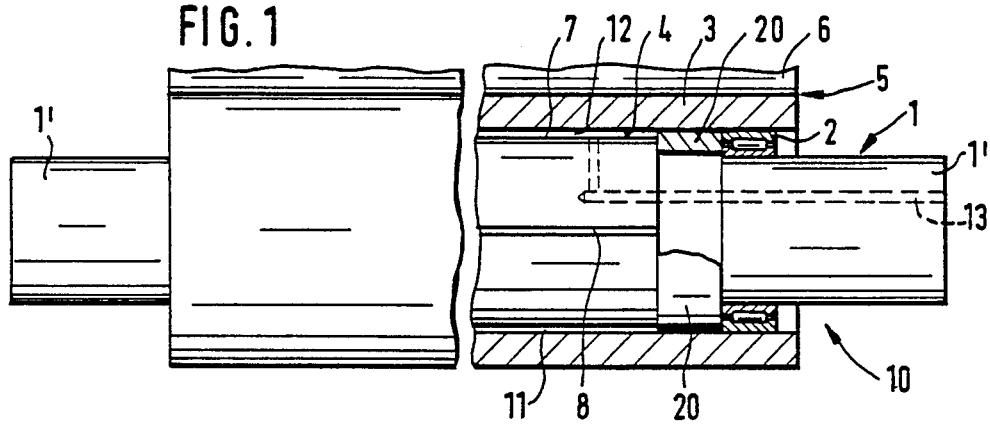
FIG. 1 illustrates a longitudinal view of a roll, partly in section, constructed according to the principles of the invention.
Figure 3:
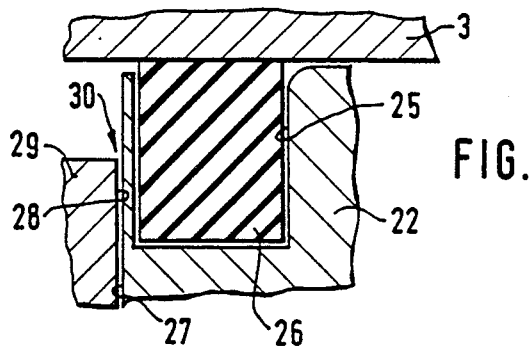
FIG. 3 illustrates a partial cross-sectional view, in enlarged scale, of the sealing ring shown in FIG. 2.

The roll 10 illustrated in FIG. 1 comprises a stationary crosshead 1 that extends through a rotatable hollow cylinder 3 having an inner circumference 4, which forms an annular clearance space with the external circumference 7 of the crosshead 1. The hollow cylinder 3 is supported by journal bearings 2 that are mounted on the crosshead 1, near its ends. The ends 1' of the crosshead 1 protrude from the hollow cylinder 3 to form roll necks upon which external supporting forces can be applied, i.e., the roll necks are supported in a cylinder stand or similar supporting structure (not shown). In the embodiment shown, a counterroll 6 may abut the roll 10 from above. A roll nip 5 is formed between the rolls.

The annular clearance space formed between the inner circumference 4 of the hollow cylinder 3 and the crosshead 1 is subdivided—by longitudinal seals 8 mounted at diametrically opposed sides of the crosshead 1 (at its widest part) to abut the inner circumference 4 of the hollow cylinder 3 and by transverse end seals 20 mounted inside the hollow cylinder adjacent the journal bearings 2—into a longitudinal chamber 12 located adjacent the roll nip 5 and a longitudinal chamber 11 opposite the roll nip 5. A supply line 13 is formed in the crosshead for conducting hydraulic fluid into the longitudinal chamber 12. This hydraulic fluid exerts pressure against both the inner circumference 4 of the hollow cylinder 3 and the external circumference 7 of the crosshead 1. The pressure of the fluid in the longitudinal chamber 12, which is needed to produce the line pressure, can cause the crosshead 1 to bend within the annular clearance without coming into contact with the inner circumference 4 of the hollow cylinder 3. In addition, the hollow cylinder 3 may be bent intentionally since the ends of the hollow cylinder 3 are supported on the crosshead 1 by journal bearings 2. The hydraulic fluid can be heated, thereby increasing the temperature of the hollow cylinder 3, if necessary for the treatment of a fabric web.

During the rotation of the hollow cylinder 3, some hydraulic fluid always flows into the lower chamber 11 so that the lower chamber eventually becomes filled. In certain cases, it may be desirable to intentionally fill the lower chamber 11 with hydraulic fluid to create a pressure differential with the pressure in the longitudinal chamber 12. Neither the supply lines that are provided for filling the lower chamber 11, nor the return lines from the longitudinal chamber 12 are shown for reasons of clarity.

Figure 2:
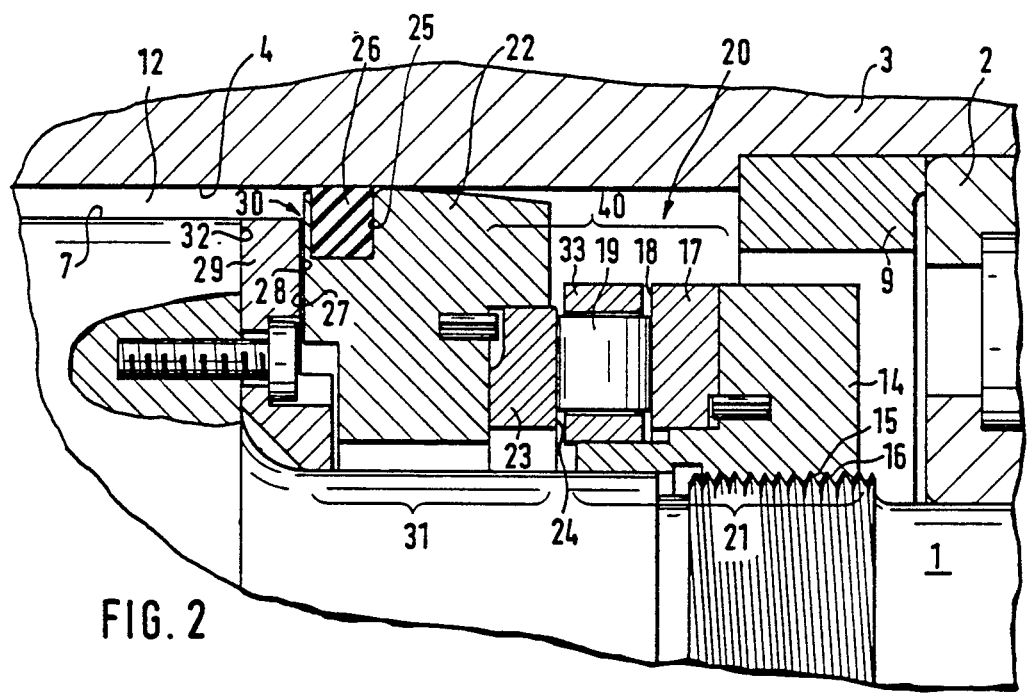
FIG. 2 illustrates, in enlarged scale, a partial cross-sectional view of the sealing area at one end of the roll of FIG. 1.

The transverse end seal 20 is shown in detail in FIG. 2. The journal bearing 2, which supports the hollow cylinder 3 on the crosshead 1, axially abuts a spacer ring 9 that rotates with the hollow cylinder 3. A bearing ring 21, comprised of a nut 14 having an internal screw thread 15 and an outer race 17, is mounted on the crosshead 1. The nut 14 is screwed onto an external screw thread 16 provided on the crosshead 1. The race 17 is located on the side of the nut 14 opposite the journal bearing 2 and is a part of a roller bearing 40. The race has a bearing surface 18 formed perpendicular to the axis of the crosshead 1 for abutting cylindrical rollers 19 distributed around the circumference of the crosshead 1. The rollers 19 are maintained in a cage 33 and instead of cylindrical rollers 19, other types of roller bearings may be provided. An inner race 23 having a bearing surface 24, which also is perpendicular to the axis of the crosshead 1, is provided on the side of the rollers 19 opposite race 17. Race 23 is connected to a thrust ring 22, which together form the bearing ring 31. The thrust ring 22 extends radially almost to the inner circumference 4 of the hollow cylinder 3. A circular groove 25 is provided on the side of the thrust ring 22 opposite the journal bearing 2, i.e., the left side in FIG. 2. A sealing ring 26, which is designed like a piston ring, is mounted in the circular groove 25 and is compressed between groove 25 and the inner circumference 4. The sealing ring 26 is mounted within the circular groove 25 with play and has some freedom of motion to shift and tilt somewhat therein. Since the thrust ring 22 and the sealing ring 26 both rotate with the hollow cylinder 3 and there is no relative displacement between the sealing ring 26 and the inner circumference 4 of the hollow cylinder 3 in the circumferential direction, the thrust ring 22 can maintain its relative position within the hollow cylinder 3 because of the play, even in the case of slight axial displacements or tilting of the sealing ring 26. The displacements of the sealing ring 26 resulting from being carried along with the hollow cylinder 3 take place within the circular groove 25. As a result, the amount of frictional wear on the inner circumference 4 of the hollow cylinder 3 is reduced.

The left end of the thrust ring 22, as shown in FIG. 2, has a flat surface 27, which is perpendicular to the axis of the crosshead 1 and defines one side of a clearance gap 30. A ring 29 connected to the crosshead 1 abuts against a radial shoulder 32 of the crosshead 1. The right end of this ring 29, as shown in FIG. 2, has a flat surface 28 that also is perpendicular to the axis of the crosshead 1. The flat surface 28 faces the flat surface 27 and is spaced at a small clearance therefrom to form the other side of the clearance gap 30. This gap 30 provides such a large resistance to flow that it operates as a seal to keep the high pressure hydraulic fluid in the longitudinal chamber 12, even though the rotating thrust ring 22 and the stationary ring 29 do not contact each other.

The width of the gap 30 is less than 0.1 mm and when the longitudinal chamber 12 is at high pressures, the gap may lie in the range of 0.02 mm. The size of the gap 30 can be adjusted by rotation of the nut 14. Considerable demands are made on the roller bearing 40, which has quite a large diameter depending upon the diameter of the crosshead 1, in light of the small size of the gap 30.

The hydraulic fluid introduced into the longitudinal chamber 12 exerts a pressure in the axial direction against the edge region of the thrust ring 22 adjacent the inner circumference 4 of the hollow cylinder 3. The hydraulic fluid also exerts a pressure in the gap 30 against the gap surface 27, which press the thrust ring 22 to the right according to FIG. 2 against the cylindrical rollers 19. This eliminates the need for springs to keep the individual parts of the transverse end seal 20 in mutual contact.

What is claimed is:

1. A roll comprising:
    a rotatable hollow cylinder having an inner circumference and an outer working circumference;
    a stationary crosshead extending lengthwise through the hollow cylinder to form a surrounding clearance space with the inner circumference of the hollow cylinder, said crosshead having ends protruding from the hollow cylinder upon which external forces for supporting the roll can be applied;
    means provided in the clearance space for hydraulically supporting the hollow cylinder;
    transverse end seals mounted near the ends of the crosshead extending between the crosshead and the inner circumference of the hollow cylinder to seal the clearance space, each transverse end seal including:
        first and second radially extending, flat surfaces spaced from each other to define a clearance gap therebetween, said first and second surfaces being axially supported on the crosshead;
        a first bearing ring mounted for rotation with the hollow cylinder and having ann outer portion, slightly displaceable relative to the remaining portion of the first bearing ring, sealing the clearance space at the inner circumference of the hollow roll, said first surface being formed on the first bearing ring;
        a second bearing ring mounted on the crosshead; and
        a roller bearing disposed between said first and second bearing rings maintaining, in conjunction with hydraulic fluid contained in the clearance space, the spacing between said first and second surfaces independent of relative displacement between the hollow cylinder and the crosshead.

2. The roll of claim 1 wherein each transverse end seal further comprises means for adjusting the width of the clearance gap.

3. The roll of claim 2 wherein said adjusting means includes the second bearing ring, which comprises a nut mounted on a threaded portion of the crosshead whereby rotation of said nut adjusts the width of the clearance gap.

4. The roll of claim 1 wherein said first surface of the clearance gap faces the interior of the hollow cylinder and the roller bearing is mounted axially outside of the clearance gap.

5. The roll of claim 1 wherein said first bearing ring comprises a thrust ring forming an inner race of the roller bearing and said second bearing ring comprises a nut forming an outer race of the roller bearing.

6. The roll of claim 2 wherein said first bearing ring comprises a thrust ring forming an inner race of the roller bearing and said second bearing ring comprises a nut forming an outer race of the roller bearing.

7. The roll of claim 3 wherein said first bearing ring comprises a thrust ring forming an inner race of the roller bearing and said nut forms an outer race of the roller bearing.

8. The roll of claim 4 wherein said first bearing ring comprises a thrust ring forming an inner race of the roller bearing and said second bearing ring comprises a nut forming an outer race of the roller bearing.

9. The roll of claim 5 wherein said inner race is formed as a separate piece abutting the thrust ring and said outer race is formed as a separate piece abutting the nut.

10. The roll of claim 9 further comprising a ring secured to the crosshead, said second surface being formed on said ring.

11. The roll of claim 9 wherein said second surface is formed on the crosshead.

12. The roll of claim 1 wherein said outer portion of the first bearing ring comprises an annular groove having a sealing ring mounted therein with play, said sealing ring sealingly abutting the inner circumference of the hollow cylinder.

13. The roll of claim 2 wherein said outer portion of the first bearing ring comprises an annular groove having a sealing ring mounted therein with play, said sealing ring sealingly abutting the inner circumference of the hollow cylinder.

14. The roll of claim 3 wherein said outer portion of the first bearing ring comprises an annular groove having a sealing ring mounted therein with play, said sealing ring sealingly abutting the inner circumference of the hollow cylinder.

15. The roll of claim 4 wherein said outer portion of the first bearing ring comprises an annular groove having a sealing ring mounted therein with play, said sealing ring sealingly abutting the inner circumference of the hollow cylinder.

16. The roll of claim 5 wherein said outer portion of the first bearing ring comprises an annular groove having a sealing ring mounted therein with play, said sealing ring sealingly abutting the inner circumference of the hollow cylinder.

17. The roll of claim 9 wherein said outer portion of the first bearing ring comprises an annular groove having a sealing ring mounted therein with play, said sealing ring sealingly abutting the inner circumference of the hollow cylinder.

18. The roll of claim 10 wherein said outer portion of the first bearing ring comprises an annular groove having a sealing ring mounted therein with play, said sealing ring sealingly abutting the inner circumference of the hollow cylinder.

19. The roll of claim 11 wherein said outer portion of the first bearing ring comprises an annular groove having a sealing ring mounted therein with play, said sealing ring sealingly abutting the inner circumference of the hollow cylinder.

* * * * *